3,177,786
PHOTOGRAPHIC CAMERA WITH AUTOMATIC
EXPOSURE SETTING
Waldemar T. Rentschler, Calmbach (Enz), Germany,
assignor to Alfred Gauthier G.m.b.H., Calmbach
(Enz), Germany, a corporation of Germany
Filed July 3, 1962, Ser. No. 207,191
Claims priority, application Germany, July 7, 1961,
G 32,668
6 Claims. (Cl. 95—10)

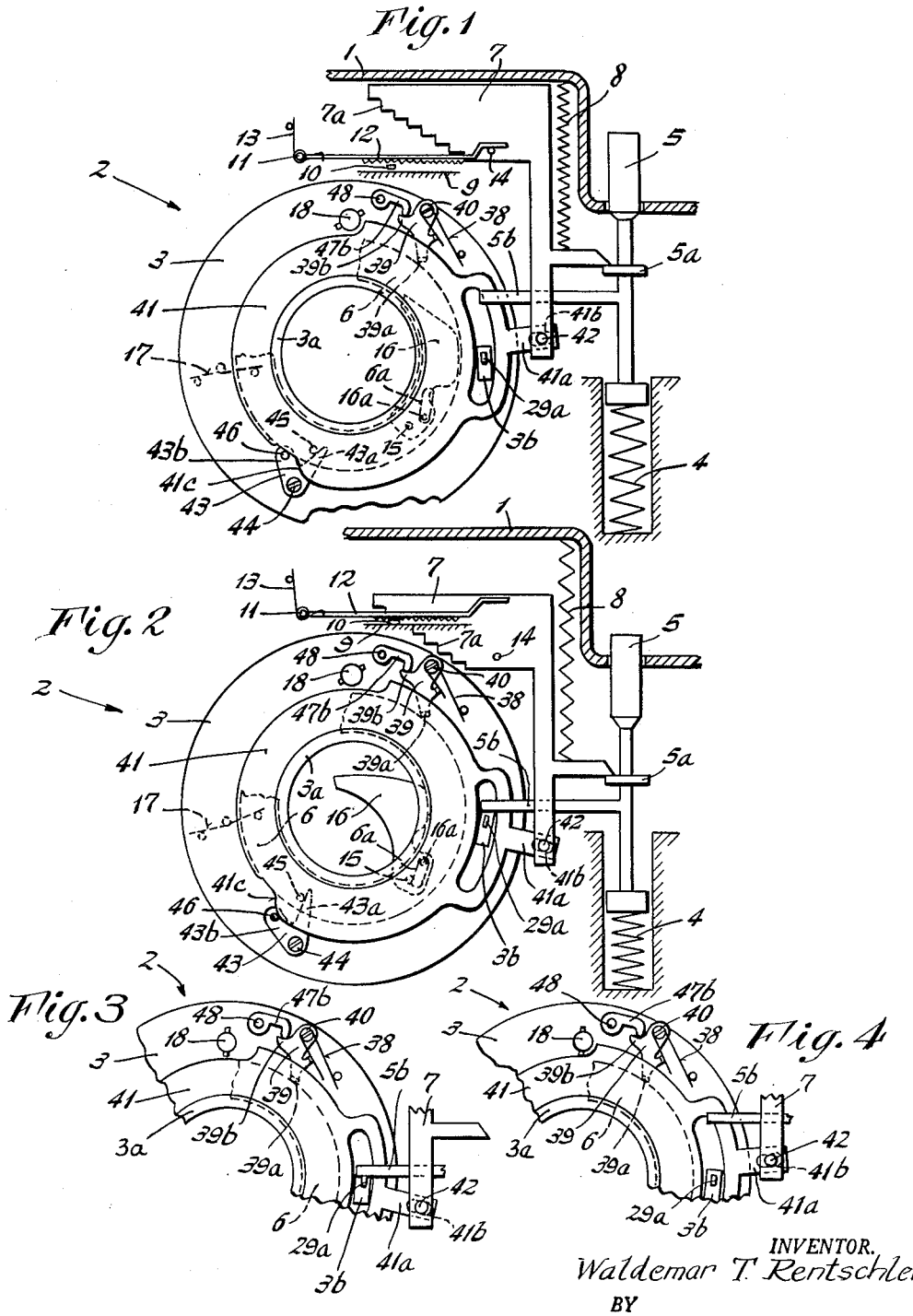

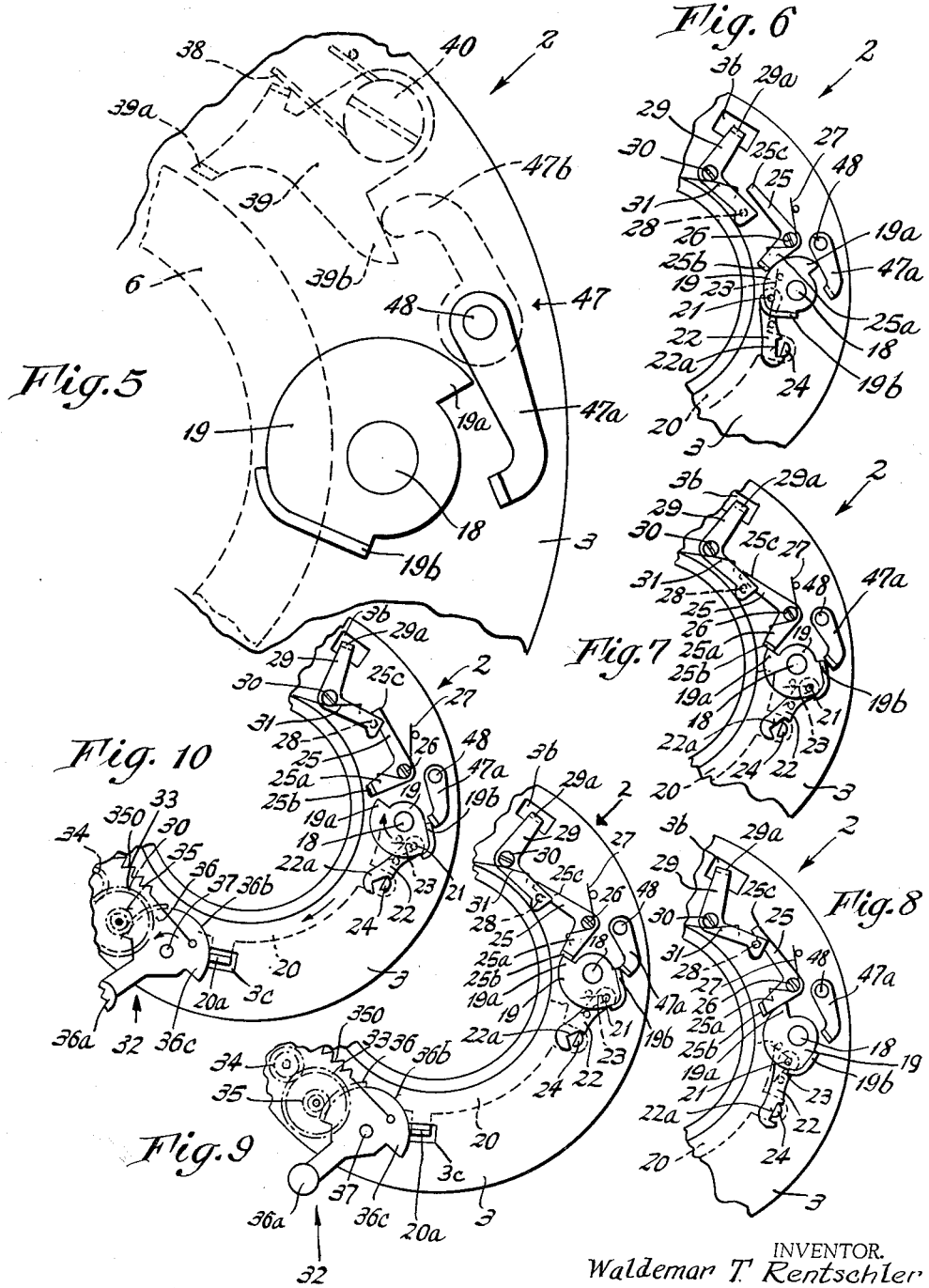

This invention relates to photographic cameras which are supplied with automatic exposure setting devices and, more particularly, to cameras in which a light responsive, movable sensing member, effects the automatic adjustment of a setting member to the position providing proper exposure.

A camera of this type is the subject of my copending application Serial No. 61,209, now Patent No. 3,105,427, comprising a novel combination of a locking or holding device which is constructed and arranged to retain the exposure setting member in an adjusted position as initially determined by the light responsive position of a movable member of the exposure meter.

The locking device includes a movable detent which is shifted into locking and holding position in response to the actuation of the camera or shutter release after the exposure setting member has been adjusted. The detent is released and rendered inoperative by a part of the shutter drive mechanism after the operation of the shutter has been completed.

Photographic cameras provided with the invention described in application Serial No. 61,209 have the advantage that exposures of any kind, especially exposures having long exposure times or those utilizing a delayed action device, may be carried out without requiring that the operator afford the slightest attention to the handling or manipulation of the shutter or camera release.

The present invention constitutes an improvement over that set forth in the aforesaid application.

It is an object of the present invention to provide means for operatively connecting the light responsive sensing member and the exposure setting member whose manner of construction and arrangement may be varied to accommodate existing conditions.

Another object of the present invention is to provide means for operatively connecting the sensing member and the exposure setting member which positively act to automatically provide the proper exposure setting directly in response to the movement of the sensing member.

A further object of the present invention is to provide means for accomplishing the automatic adjustment of the exposure setting member while also preventing the motive forces of the sensing member from unduly influencing the setting member.

The foregoing objects are accomplished by the present invention by providing structure for maintaining the exposure setting device in its proper position by direct contact with the exposure setting member and by the provision of a second setting or adjusting member operatively engaging the sensing member and transmitting motion to the setting member only when moved in the direction for setting the exposure.

In accordance with the invention, the operative connection between the sensing member and the exposure setting means may be constructed in a variety of forms, shapes and arrangements to accommodate the existing requirements. In addition, the connection may be established in a number of ways as, for example, spring loaded couplings, pin-and-slot connections or interlocking arrangements.

In view of the fact that the adjusting member, which is operatively connected to the sensing member, motivates the exposure setting member only when moved in the direction for setting the exposure, there is no force transmitted to the exposure setting member after the setting motion is completed. The setting member thereafter is completely free from any interference caused by the release motion of the sensing member or the releasing means. Therefore, an additional advantage is obtained by the present invention in that the setting member may be retained in its adjusted position by a relatively minor force which need only counteract a comparatively small influence tending to return the setting member to its initial position. It is therefore possible to construct the retaining device in a simple manner which does not have any complexity of parts and, consequently, limits the possibility of damage to the operative mechanism. The retaining device is actuated without the expenditure of a great deal of motive power or stress.

A feature resulting from the construction of the present invention is that the adjusting characteristic of the exposure setting member is flexible and enables a freedom of choice. The adjusting characteristic of the exposure setting member is determined by the type of connection with the controlling adjusting member and is not influenced in any way by the return movement of the sensing member.

The present invention provides an extremely economical and uncomplicated structure for retaining the exposure setting member in its adjusted setting position as determined initially by the position of the movable member of the exposure meter. In fact, there need be no special provision made of complex structure in that the retaining device itself may be formed as a friction brake.

In the disclosure hereinafter set forth for exemplary purposes, the retaining device may comprise a spring biased, rotatably movable lever which is operatively connected to the shutter drive means by a two-armed rocking lever. The operative connection is established in such fashion that the retaining device does not engage the exposure setting member either in the non-cocked or cocked position of the shutter driving member while it nevertheless engages the exposure setting member before the actual running down of the exposure.

Other features and advantages of the present invention are shown in the following specification and the accompanying drawings which illustrates an exemplary embodiment of the present invention.

In the drawings:

FIG. 1 is a diagrammatic, elevational view taken from the rear of an intra-lens shutter and showing the retaining device for the exposure setting member in inoperative position.

FIG. 2 is a view like FIG. 1 but showing the parts in positions occupied immediately prior to the release of the shutter.

FIG. 3 is a fragmentary view of the shutter arrangement shown in FIGS. 1 and 2 in setting position immediately after release and showing the retaining device in operative position.

FIG. 4 is a view similar to that of FIG. 3 showing the retaining device in operative position after the sensing member has returned to its starting position.

FIG. 5 is an enlarged, fragmentary view showing the retaining device in inoperative position while the shutter is in non-cocked position.

FIG. 6 is a fragmentary, elevational view taken from the front of the shutter, showing the shutter with the driving and releasing device in non-cocked position.

FIG. 7 is a view like FIG. 6, showing the shutter mechanism in cocked position, ready for release.

FIG. 8 is a view like FIG. 6 showing the shutter drive means in release position. The retaining device is moving toward operative position.

FIG. 9 is a fragmentary, elevational view taken from the front of the shutter, showing a delayed action device in cocked position and the retaining device of the present invention.

FIG. 10 is a figure like FIG. 9, showing the shutter immediately after its release. The retaining device is operative. The driving member is retained by the control member of the delayed action device, after release for running down movement.

Referring specifically to the drawings, there is illustrated a camera housing 1 (only partially shown for clarification purposes), and an intra-lens shutter assembly 2 which is affixed to the front of the housing 1 in a well-known manner through means of a tubular, threaded connection 3a projecting from the rear of the shutter housing 3. The shutter housing is provided with clearance slots 3b and 3c for the purposes hereinafter set forth. A helical compression spring 4 normally urges a longitudinally movable shutter release member 5 in an upward direction. The release member is provided with a collar or flange 5a and a laterally extending arm 5b. For effecting an automatic exposure setting, a diaphragm setting ring 6, provided with a slot 6a, is disposed on the rear of the shutter housing 3. A sensing member 7 which moves to a position determined by the measuring mechanism of a built-in exposure meter as hereinafter described is operatively connected to the setting ring 6.

The sensing member may, as exemplarily illustrated, be constructed in the form of a slide provided with a stepped abutment edge 7a. The sensing member is guided on a fixed member of the measuring mechanism of the exposure meter and moves vertically in a direction parallel to the direction of movement of the release member 5. A helical compression spring 8 is mounted between and secured to the housing 1 and an arm extending from the sensing member. The spring 8 maintains an abutting relation between the sensing member 7 and the collar or flange 5a of the camera release. However, the spring 8 is weaker than the helical compression spring 4 which influences the release member 5 and, therefore, the sensing member 7 is normally disposed in inoperative position when the release member is in its raised or inactive position.

When the release member is depressed and thereby actuated, its collar 5a becomes disengaged from its support of the sensing member and the latter, under the influence of spring 8, moves downwardly. This movement continues to a point where the stepped edge 7a of the sensing member 7 engages the needle or pointer 10 connected to the movable mechanism of the measuring device.

Before the sensing operation begins, the needle 10 is clamped in its adjusted position in a well known manner by means of a lever 12 which is pivotable about an axis 11. The lever 12, under the influence of a wire spring 13, engages a pin 14 disposed on the sensing member 7. When the sensing member 7 is in its raised or starting position, the needle 10 is freely movable over a fixed surface or base 9. However, when the release member is depressed and thereby actuated, the lever 12 is disengaged from its contact with the pin 14 and the lever, moving under the influence of spring 13, clamps the needle 10 in its adjusted position against the base 9. The clamping or locking of the needle 10 is accomplished by its engagement with the grooved or serrated undersurface of the lever 12 and is effected prior to the adjustment of the diaphragm setting member 6.

The diaphragm comprises a plurality of segments or lamellae 16 which are pivotally movable on pins 16a about fixed bearing pins 15 and which engage the setting ring 6 by means of the pin-and-slot connections 16a, 6a. A light spring 17 maintains the setting ring 6 in the position shown in FIG. 1 wherein the diaphragm is fully opened.

In order to cock the shutter, a cocking shaft 18 is disposed in the shutter housing 3 and may be connected to the film transport device of the camera in a well-known manner. The end of the shaft 18, which projects into the shutter housing carries a driving disk 19 provided with a shoulder 19a and an arresting edge 19b. The disk 19 is operatively connected to means for arresting movement of the setting ring 6 in the manner hereinafter described.

As illustrated in FIGS. 6–10, a driving ring 20, provided with a lug 20a, actuates the shutter blades (not illustrated for clarification purposes). The actuation is accomplished by means of a link 22 which is provided with a notched portion 22a and is pivotally mounted, in a well-known manner, on pin 21 carried by the driving disk 19. The notched portion 22a engages under the action of a light spring 23 a semicircular pin 24 fixed on the driving ring 20. As a result of this construction, the driving ring 20 moves reciprocally upon the running down of the driving disk 19 in the direction of the arrow shown in FIG. 10. The movement of the disk 19 and the opposite movement of the ring 20 causes the shutter blades to open and thereafter close in a manner well understood in the art.

To retain the shutter driving disk 19 in its cocked position, as shown in FIGS. 7 and 9, a two-armed arresting lever 25 is pivotally mounted about a pin 26. One arm 25a of the arresting lever is provided with a lug 25b which engages the projection or shoulder 19a, while the other arm 25c of the lever 25, under the influence of spring 27, engages a pin 28 fixed on a releasing lever 29. The releasing lever 29 is provided with a lug 29a and is pivotally disposed around an axis 30 in the shutter. The lever 29 is biased for movement in a clockwise direction by a spring 31. An operative connection between the lever 29 and the release member 5 is established by reason of the fact that the lug 29a on the lever 29 projects from the rear wall of the shutter housing 3 and extends through the clearance slot 3b into the path of movement of the arm 5b of the release member 5. It will be understood that with the foregoing construction the driving disk 19 is released by the arresting lever 25 only after the automatic setting of the diaphragm ring 6 has been completed.

The present invention may be used in conjunction with known means for delaying the action of the shutter (only partially illustrated in FIGS. 9 and 10 for clarification purposes). The delayed action mechanism 32 which is released by the shutter release member in a manner well known in the art comprises intermeshing gears 33 and 34 which are operatively connected by a pinion 35, arranged in the shutter, with a cocking segment 36. The cocking segment 36 is pivotally movable about an axis 37 in a counterclockwise direction under the influence of spring 350 and is provided with a movable finger 36a, an arresting cam 36b, and a shoulder 36c. The cocking segment 36 is moved into cocked position as shown in FIGS. 9 and 10, by the manipulation of the finger 36a, in which position it is held by means of an arresting lever (not shown for reasons of clarity of illustration). When the driving disk 19 is released there is a resultant delay in the movement of the driving ring 20. This is accomplished by the engagement of the driving ring lug 20a (which extends through the slot 3c in the housing 3) with the arresting cam 36b shortly after the initial movement of the driving ring 20 and prior to the opening of the shutter. During this initial movement of the ring 20 it acts upon the arresting lever holding the delayed action mechanism in cocked position and releases the mechanism for running down movement under the influence of its spring 350. Thereafter, the opening of the shutter is delayed for that period of time which is absorbed by the passage of the lug 20a of the driving ring 20 along the cam 36b of the segment 36. By means of this construction, the shutter operates only after the cocking segment has run down moving in the direction of the arrow shown in FIG. 10, thereby releasing the lug 20a from engagement with the cam 36b. Thereafter, the shutter continues its movement in the manner hereinbefore set forth.

A locking device cooperates with the shutter arrangement and acts directly on the diaphragm setting ring 6 utilized for the exposure setting. Associated with the diaphragm setting ring is a second setting or adjusting member 41 which is connected to the sensing member 7, and is therefore movable in response to the actuation of the release member 5. The adjusting member drives the diaphragm setting member 6 only when moved in the setting direction. This driving connection is established, for example, by means of a cam controlled angle lever.

The locking device, in accordance with the present invention, essentially comprises an arresting lever 39 provided with a lug 39a and a shoulder 39b. The arresting lever tends to move in a clockwise direction by reason of the influence of wire spring 38, the said lever being pivotally mounted about an axis 40 as shown in FIGS. 1–5. The arresting lever 39 provides a frictional brake against movement of the setting ring 6 by means of the engagement of the lug 39a with the outer surface of the ring 6 at the time and in the manner hereinafter described.

As aforesaid there is provided a second setting or adjusting member 41 which is associated with the diaphragm setting ring 6 and which moves in response to the actuation of the release member 5 and the sensing member 7. The adjusting member 41 is shown in the form of a ring having a slotted, laterally extending arm 41a and an eccentric 41c. The operative engagement of the ring 41 and the sensing member 7 is accomplished by the disposition of the pin 42, carried by the sensing member 7, within the slot 41b of the arm 41a. The operative engagement between the ring 41 and the diaphragm setting ring 6 is established by means of an angle lever 43 provided with arms 43a and 43b and pivotally mounted about an axis 44. One arm 43a of the angle lever engages a pin 45 fixed on the diaphragm setting ring 6. When the release member is inactive, the influence of the spring 17 on the diaphragm setting ring 6 causes the lever 43 to be maintained in the position wherein a pin 46 on the other arm 43b engages the eccentric 41c of the control ring 41.

When the camera release is depressed, the arresting lever 39 is moved, as shown in the illustrated embodiment, by a disposable member shown in the form of a rockable lever 47 provided with arms 47a and 47b which are secured against rotation on a shaft 48 in the shutter housing and are controllable by the shutter driving disk 19. In both the cocked and non-cocked condition of the shutter, the arms 47a and 47b are maintained in the position illustrated in FIGS. 5–8. In this position the arm 47a engages the shoulder 19a when the shutter is in noncocked position and the control edge 19b when the shutter is in cocked position. While the arm 47a is so engaged, the other arm 47b maintains the arresting lever 39 in inoperative position by its tensional contact with the projection 39b thereby holding the arresting lever against its tendency to move under the influence of spring 38.

It will be understood that while the lever 47 is illustrated as a separate member disposed intermediate the arresting lever 39 and the driving disk 19 to provide for flexibility of position and choice of construction and arrangement of the arresting lever, the actuation of the arresting lever may be effected in other ways, according to the present invention. For example, an extension, in the shape of the arm 47a, could be directly provided on the projection 39b of the arresting lever 39 to cooperate with the shutter driving disk 19.

The method of operation of the structure of the present invention is as follows:

The release member 5 is depressed and moves against the action of spring 4 causing the collar 5a to be removed as the support for the sensing member 7. As hereinbefore described, the needle or pointer 10 is first clamped in position by the lever 12. The sensing member under the influence of spring 8 thereafter moves downwardly. This movement of the sensing member is transmitted through the pin and slot coupling 42, 41b to the ring 41 which thereupon moves in a rotary, clockwise direction.

The eccentric 41c acts upon the lever 43 causing the arm 43a to bear against the pin 45 on setting ring 6 thereby moving the setting ring 6 in a clockwise direction. As the sensing member moves further downwardly, one of its steps 7a encounters the needle or pointer 10 resting on the base 9 in a position determined by the existing light conditions. It will be understood that this engagement occurs and accomplishes thereafter the setting of the ring 41, the diaphragm setting member 6 and the lamellae 16.

Upon the completion of the setting operation, the arm 5b of the release member, moving downwardly, engages the arm 29a of the shutter release lever 29 and causes the lever 29 to rotate in a counterclockwise direction. As a result, the arresting lever 25 which normally maintains the shutter driving disk 19 in cocked position is caused to pivot against the action of spring 27 and becomes disengaged from the projection 19a on the disk 19. The shutter driving disk is thereby released for running down motion as shown in FIGS. 8 and 10. During the running down motion of the driving disk 19, the arm 47a which was supported by the control edge 19b is disengaged and as a result of the action of the spring 38 on the arresting lever 39, the arm 47a pivots into the space between the control edge 19b and the projection 19a of the driving disk 19. Also, under the action of spring 38, the arresting lever 39 moves and is brought to bear against the outer circumference of the diaphragm setting ring 6 as shown in FIGS. 3 and 4. The frictional engagement of the diaphragm setting ring 6 by the arresting lever 39 thereby causes the setting ring to be set in the position initially determined by the light responsive position of the needle or pointer 10. This setting is maintained atfer the release of the release member 5 and the return of the sensing device 7 to its initial position. The return of the sensing device has no effect or influence upon the adjusted setting of the diaphragm setting ring 6 and it is, therefore, possible to maintain the diaphragm setting ring in adjusted position merely by the use of a frictional brake. It is further to be noted that the engagement of the arresting lever 39 with the diaphragm setting ring 6, while frictional, is nonetheless completely positive. To maintain the positive locking operation, it is only necessary to counteract the relatvely low restoring influence of the spring 17 acting on the setting ring 6. As a result of this construction, only a comparatively light spring 38 is needed to move the arresting lever 39, and consequently the arresting lever 39 has very little effect on the action of the driving disk 19. As a result, the functioning of the shutter driving mechanism is in no way influenced, effected or disturbed by the release of the sensing member. Further, the ability to accomplish the desired result with only an extremely light restoring moment makes it possible to use a locking device which holds the diaphragm setting ring 6 in appropriate position merely by frictionally engaging the setting ring.

After the shutter is returned to its closed position, the arresting lever 39 is released from its frictional contact with the diaphragm setting ring 6. This is accomplished by the engagement of the projection 19a of the driving disk 19 with the arm 47a of the lever 47. The arm 47a is thereupon pivoted against the influence of the spring 38 acting upon the arresting lever 39, and urging it into the position shown in FIGS. 5 and 6 whereby the arresting lever then occupies the inoperative position illustrated in FIGS. 1, 2 and 5.

In the event the structure for delaying the operation of the shutter is used, the arm 47a is released as hereinbefore described and the diaphragm setting ring moves until it is engaged by its arresting lever 39. During this time, the shutter driving disk 19 also moves until the shutter driving ring 20 operatively connected thereto contacts the cam 36b on the cocking segment 36 of the delayed action mechanism. This contact is established between the lug 20a of the driving ring 20 and the cam 36b and occurs after only limited movement of the shutter driving ring 20 during which time the shutter is not yet opened. The contact between the lug 20a and the cam 36b delays the running down motion of the shutter driving disk 19 and the driving ring 20. The delay continues during the period in which the cam 36b of the cocking segment 36, moving in a counterclockwise direction, slides along in continued engagement with the lug 29a of the driving ring 20. After the cam 36b and lug 20a become disengaged at the termination of the running down motion, the driving ring 20 continues to move and the shutter becomes operative. At the conclusion of the operation of the shutter, the arresting lever 39 is disengaged from its contact with the setting ring in the manner hereinbefore described and the structural parts return to their original position.

While the invention has been described in detail in connection with one illustrative embodiment thereof, it is to be understood that the description and illustration is merely exemplary and that variations and modifications may be made without departing from the spirit of the invention or the scope of the appended claims.

I claim:

1. A photographic camera of the type having an exposure meter provided with a measuring mechanism and movable member thereof, and having a sensing member and an exposure setting member, said sensing member moving to an adjusted position as determined by the movable member in response to actuation of the camera or shutter release, an adjusting member engaging the sensing member and actuating the exposure setting member and a retaining device for holding the exposure setting member in any of its various adjusted positions, the said retaining device comprising a shutter driving member having a cocked and non-cocked position, arresting means for holding the exposure setting member against movement from its adjusted position, and a displaceable member, movable by the driving member, for maintaining the arresting means in inoperative position in the cocked and non-cocked position of the driving member and engaging the exposure setting member upon movement of the displaceable member by the driving member.

2. A photographic camera in combination with an exposure meter having a movable measuring member and a sensing member for sensing the position of said movable member, a camera release member operatively connected to said sensing member, an adjusting member connected to said sensing member, whereby the movement of said sensing member in response to the actuation of said release member affects the adjusted position of said adjusting member, an exposure setting member, a transmission means interconnecting said adjusting member to said setting member whereby the movement of said adjusting member is transmitted to said setting member to effect the setting thereof, and locking means acting directly on said setting member for maintaining it in its adjusted position and which locking means is released after the operation of the camera shutter has been completed.

3. The invention as defined in claim 2 wherein said locking means comprises a frictional braking detent responsive to the operation of the camera shutter drive and movable between operative and inoperative position whereby in the operative position said detent is disposed in direct frictional holding engagement with said setting member.

4. A photographic camera, an exposure meter having a movable measuring means and a sensing means for sensing said movable means, a camera release member operatively connected to said sensing member, an adjusting member connected to said sensing member whereby said movement of said sensing member adjusts the position of said adjusting member accordingly, an exposure setting member, transmission means operatively interconnecting said adjusting member to said setting member whereby the movement of said adjusting member to its adjusted position in response to the release of said camera release is transmitted through said transmission means to said setting member to set the position of said setting member accordingly, a shutter mechanism including a shutter drive means, a shutter arresting means operatively associated with said drive means for maintaining the latter in its cocked position, a locking device for acting directly on said setting member for maintaining the same in its adjusted position, said locking means being positioned with respect to said setting member, and actuating means responsive to the operation of said shutter drive means to effect the operation of said locking means, said actuating means being operatively associated between said shutter drive means and said locking means so that the latter is maintained out of locking position in both the non-cocked and in the cocked position of said drive means and in locking engaging position with said setting member during run-down of said shutter drive.

5. A photographic camera in combination with an exposure meter having a movable measuring means and a sensing means for sensing said movable means, a camera release member operatively connected to said sensing member, an adjusting member connected to said sensing member whereby the movement of said sensing member adjusts the position of said adjusting member accordingly, and an exposure setting member, transmission means operatively interconnecting said adjusting member to said setting member, said transmission means including a two arm lever pivotally mounted at the juncture thereof, one arm of said lever being operated upon by said adjusting member and the other arm of said lever operating on said exposure setting member whereby the movement of said adjusting member to its adjusted position in response to the release of said camera release is transmitted by the action of said two arm lever to said setting member to set the position of said setting member accordingly, a shutter mechanism including a shutter drive means, a shutter arresting means operatively associated with said drive means for maintaining the latter in a cocked position, a locking device arranged for acting directly on said setting member for maintaining the same in its adjusted position, said locking device including a pivotally mounted friction brake lever movable between locking and unlocking position with respect to said setting member, and an actuating means responsive to the operation of said shutter drive means to effect the operation of said brake lever, whereby the brake lever is maintained out of locking position in both the non-cocked and in the cocked position of said drive means and in locking engaging position with said setting member during the run-down of said shutter run-down.

6. A photographic camera in combination with an exposure meter having a movable measuring means and a sensing means for sensing said movable means, a camera release member operatively connected to said sensing member, an adjusting member connected to said sensing member whereby the movement of said sensing member adjusts the position of said adjusting member accordingly, said adjusting member being developed as a ring having a cam formed on a peripheral portion thereof, an exposure setting member, transmission means operatively interconnecting said adjusting member to said setting member, said transmission means including a two arm lever pivotally mounted at the juncture thereof, a cam follower connected to one arm of said lever, and the other arm thereof acting on said exposure setting member whereby the movement of said adjusting member to its adjusted position in response to the release of said camera release is transmitted by the action of said cam follower on said cam through said two arm lever to said setting member to set the position of said setting member accordingly, a shutter mechanism including a shutter drive means, a shutter arresting means operatively associated with said drive means for maintaining the latter in its cocked position, a locking device for acting directly on said setting member for maintaining the same in its adjusted position, said locking device including a pivotally mounted friction brake lever movable between locking and unlocking position with respect to said setting member, a spring means influencing said brake lever, and actuating means responsive to the operation of said shutter drive means to effect the operation of said brake lever, said actuating means includes a rocking lever operatively associated between said shutter drive means and said brake lever, said rocking lever operating on said brake lever so that the brake lever is maintained out of locking position both in the cocked and non-cocked position of said drive means, and in locking engaging position with said setting member prior to the start of the actual exposure run-down of said shutter drive means.

References Cited in the file of this patent
UNITED STATES PATENTS

| | | |
|---|---|---|
| 2,969,004 | Gebele | Jan. 24, 1961 |
| 3,026,783 | Winkler | Mar. 27, 1962 |
| 3,105,427 | Rentschler | Oct. 1, 1963 |